March 6, 1934.          W. G. NEWBY          1,950,322
LICENSE TAG FASTENING CLAMP
Filed July 13, 1933
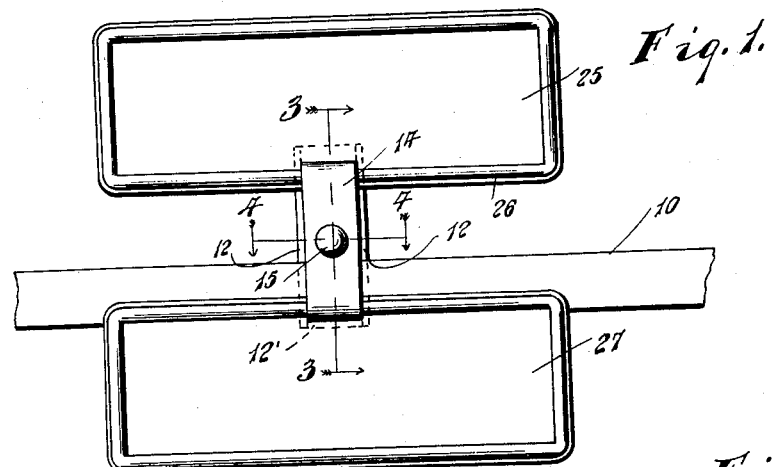
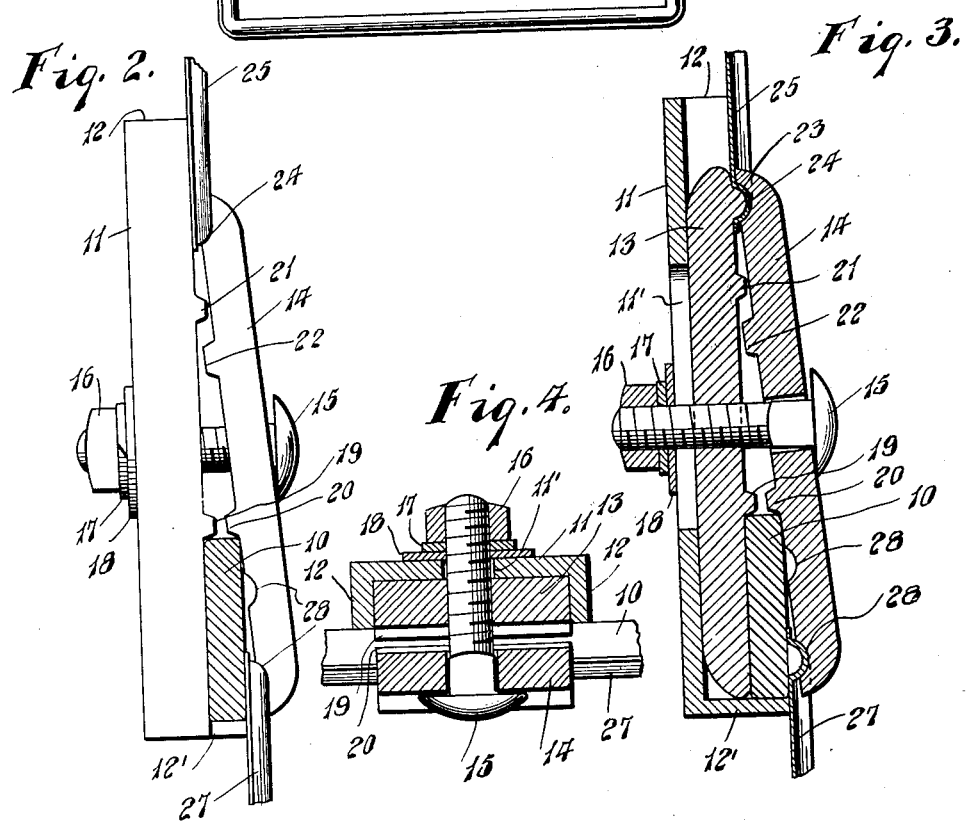
Inventor
W. G. Newby.
By L. F. Randolph Jr.
Attorney Patented Mar. 6, 1934

1,950,322

UNITED STATES PATENT OFFICE 1,950,322

LICENSE TAG FASTENING CLAMP

William G. Newby, Hertford, N. C.

Application July 13, 1933, Serial No. 680,305

5 Claims. (Cl. 40—125)

The invention relates to improved means for supporting license tags on the front of motor vehicles and has for its principal object the provision of a clamping means that will securely engage a bumper bar on the vehicle and also securely support the license tag or plate on the bumper bar.

The invention will be described in detail hereinafter and will be found illustrated in the accompanying drawing, in which Figure 1 is a front view in elevation of a fragment of an automobile bumper bar showing the improved clamping device mounted thereon and engaging a pair of plates, Figure 2 is a side view in elevation of the clamp showing it mounted on a bumper bar that is shown in section, Figure 3 is a transverse sectional view on a plane indicated by the line 3—3 of Figure 1, and Figure 4 is a detail sectional view on a plane indicated by the line 4—4 of Figure 1.

In the drawing similar reference characters are used to designate corresponding parts in all the views.

A bumper bar is shown at 10, and the improved clamping means is shown mounted thereon. The clamping means consists of a channeled base member 11 having side walls 12 and a longitudinal slot 11' in the base wall. The lower end of the channeled member 11 is closed by means of a wall 12' that extends beyond the edges of the walls 12 to provide a lip that engages under the lower edge of the bumper 10 as best shown in Figures 2 and 3. Slidably mounted in the channeled member 11 is a two-part clamp member comprising members 13 and 14, that are connected together by means of a bolt 15 or the like that extends through the slot 11' and has a nut 16 mounted thereon and engaged by means of a lock washer 17, 18 designating a wear washer engaging the channeled member 11. The clamp members 13 and 14 are provided with oppositely disposed transverse ribs 19 and 20, respectively, that engage on the upper edge of the bumper 10, and the members 13 and 14 are also provided with spacing lugs 21 and 22 that are unalined as shown. Adjacent to the upper edge of the clamping member 13 is a transverse bead 23, and the clamping member 14 is provided with an oppositely disposed groove 24, said bead and groove being adapted to engage in the usual bead on the edge of the license tag plate as shown, the plate being indicated at 25, and the bead at 26. Should a license tag plate not be provided with the bead 26 it will be apparent that the mating bead and groove 23, 24, will bend the metal so as to securely clamp the license tag in place.

The clamping member may also be used to hold other tags, such for instance as town or city tags, or other display plates, such for instance as shown at 27, and for this purpose the member 14 is provided with one or more transverse grooves 28.

In applying the device in position on the bumper bar 10, the nut 16 is unscrewed to loosen the clamping members 13 and 14 and permit them to be slid away from the wall 12'. The device is then mounted on the bumper bar with the bar in between the lower end of the members 13 and 14, and the parts 13 and 14 are then slid toward the member 12' so as to engage the bumper bar in the position as shown in Figures 2 and 3. The license plate 25 is then mounted between the other ends of the clamping members 13 and 14, and the parts are clamped together by means of the bolt 15 and nut 16.

While the device is particularly adapted for use on the front bumper bar of a vehicle in order to held the license tag plate as far as possible from the radiator, to prevent overheating in hot weather, it will be apparent that it may also be used for mounting the license plate on the rear bumper, and if desired the parts may be reversed from the position shown in the drawing so that the license plate will depend from the bumper or other support, or the license plate may be secured in the position shown for the plate 27 to the exclusion of having it mounted at the top of the clamping member.

It will also be apparent that the clamp may be used for other purposes than for holding license tag plates on automobiles, and I do not limit myself to the application of the invention as herein stated or to the construction as shown and described except where limited in the claims hereinafter included.

What I claim is:

1. A device of the character stated, comprising a channeled base member, a lip on one end of said base member to engage the edge of a supporting bar, a two-part clamping member slidably mounted on said base member, and means for adjusting the parts of said clamping member relatively to one another, said means engaging the base member and slidably mounting the clamping member thereon.

2. A device of the character stated, comprising a channeled base member having an elongated slot therein, a lip on one end of said base member to engage the edge of a supporting bar, a two-part clamping member, and a bolt connecting the parts of said clamping member together and slidably mounted in said slot.

3. A device of the character stated, comprising a channeled base member having an angular flange on one of its ends extending beyond the sides of the channeled base member to engage the edge of a supporting bar, said base member also having an elongated slot, a two-part clamping member slidably mounted in said channeled base member, and a bolt connecting the parts of said clamping member together and slidably mounted in said slot.

4. A device of the character stated, comprising a base member having an elongated slot therein, flanges extending at angles to the base member from the opposite side edges thereof and providing a channel, another flange extending from one end of the base and at an angle thereto, the last mentioned flange providing a lip to engage an edge of a supporting bar, a two-part clamp, a bolt connecting the clamp parts and engaging in said slot, one of the parts of said clamp being slidable in said channel, a stop on one of said clamp parts to limit the adjustment of the clamp relatively to the base by engaging the opposite edge of the supporting bar, said clamping parts when in clamping position providing means for supporting a plate.

5. In combination with an automobile bumper bar, a license tag holder including a channeled base member having a longitudinal slot in its base wall, one end of said channeled member being closed by a wall extending beyond the outer edges of its side walls to form a lip to engage under the bumper bar, a two-part clamp, a bolt connecting the clamp parts and engaging in said slot, one of said clamp parts being slidably mounted in the channel member and having a transverse rib thereon to engage the upper edge of the bumper bar and a transverse bead adjacent to its upper extremity, the other clamp part provided with a transverse rib opposite to the first named rib, a transverse groove in its upper end and oppositely disposed to the bead and coacting therewith to clamp a license plate and support it on the bumper bar, and a transverse groove in its lower end to receive and clamp a bead on a second plate.

WILLIAM G. NEWBY.